US009781442B2

(12) United States Patent
Sung et al.

(10) Patent No.: US 9,781,442 B2
(45) Date of Patent: Oct. 3, 2017

(54) METHOD AND APPARATUS FOR PROCESSING VIDEO SIGNAL

(71) Applicant: LG ELECTRONICS INC., Seoul (KR)

(72) Inventors: Jaewon Sung, Seoul (KR); Sehoon Yea, Seoul (KR); Moonmo Koo, Seoul (KR); Jin Heo, Seoul (KR); Taesup Kim, Seoul (KR); Jiwook Jung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 269 days.

(21) Appl. No.: 14/428,604

(22) PCT Filed: Sep. 13, 2013

(86) PCT No.: PCT/KR2013/008301
§ 371 (c)(1),
(2) Date: Mar. 16, 2015

(87) PCT Pub. No.: WO2014/042459
PCT Pub. Date: Mar. 20, 2014

(65) Prior Publication Data
US 2015/0215638 A1 Jul. 30, 2015

Related U.S. Application Data

(60) Provisional application No. 61/701,737, filed on Sep. 17, 2012.

(51) Int. Cl.
*H04N 7/12* (2006.01)
*H04N 11/02* (2006.01)
(Continued)

(52) U.S. Cl.
CPC ............ *H04N 19/52* (2014.11); *H04N 19/56* (2014.11); *H04N 19/593* (2014.11); *H04N 19/597* (2014.11)

(58) Field of Classification Search
None
See application file for complete search history.

(56) References Cited

U.S. PATENT DOCUMENTS

2007/0064800 A1   3/2007   Ha
2010/0266042 A1   10/2010   Koo
(Continued)

FOREIGN PATENT DOCUMENTS

| KR | 10-2008-0060188 A | 7/2008 |
| KR | 10-2009-0077654 A | 7/2009 |
| KR | 10-2012-0027194 A | 3/2012 |

*Primary Examiner* — Talha M Nawaz
(74) *Attorney, Agent, or Firm* — Dentons US LLP

(57) ABSTRACT

The present invention relates to a method and an apparatus for processing a video signal. The method comprises: acquiring an inter-view motion vector from a neighboring block of a current texture block; and decoding the current texture block using the acquired inter-view motion vector. The neighboring block includes a spatial neighboring block and a temporal neighboring block. The acquired inter-view motion vectors are compared with each other to determine the inter-view motion vector of the current texture block. The method and apparatus of the present invention may reduce the complexity for acquiring an inter-view motion vector and improve the accuracy of inter-view inter prediction.

6 Claims, 11 Drawing Sheets

(51) Int. Cl.
*H04N 11/04* (2006.01)
*H04N 19/52* (2014.01)
*H04N 19/597* (2014.01)
*H04N 19/593* (2014.01)
*H04N 19/56* (2014.01)

(56) References Cited

U.S. PATENT DOCUMENTS

| | | | |
|---|---|---|---|
| 2014/0247871 A1* | 9/2014 | Merkle | H04N 19/00533 375/240.12 |
| 2014/0269898 A1* | 9/2014 | Thirumalai | H04N 13/0048 375/240.02 |
| 2015/0222912 A1* | 8/2015 | Chuang | H04N 19/463 375/240.12 |

* cited by examiner

METHOD AND APPARATUS FOR PROCESSING VIDEO SIGNAL

This application is a National Stage application of International Application No. PCT/KR2013/008301 filed Sep. 13, 2013, which claims priority to U.S. Application No. 61/701,737 filed Feb. 17, 2012, both of which is incorporated by reference for all purposes as if fully set forth herein.

TECHNICAL FIELD

The present invention relates to a method and apparatus for processing a video signal.

BACKGROUND ART

Compression refers to a signal processing technique for transmitting digital information through a communication line or storing the digital information in a form suitable for a storage medium. Subjects of compression include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention can check neighboring blocks in predetermined neighboring block search order and acquire an inter-view motion vector of a current texture block from the neighboring blocks.

The present invention can check whether a spatial neighboring block and a temporal neighboring block are inter-view prediction blocks and acquire an inter-view motion vector.

The present invention can check whether a spatial neighboring block and a temporal neighboring block are reference view temporal inter-prediction blocks and acquire an inter-view motion vector.

The present invention can terminate neighboring block search for acquiring an inter-view motion vector when an inter-view motion vector is acquired from a neighboring block.

When a plurality of inter-view motion vectors is acquired, the present invention can determine the inter-view motion vector of the current texture block using the acquired inter-view motion vectors.

Advantageous Effects

When a neighboring block is checked and an inter-view motion vector is acquired from the neighboring block, the present invention can reduce complexity by terminating neighboring block search for acquiring the inter-view motion vector.

When neighboring blocks are checked and a plurality of inter-view motion vectors is acquired from the neighboring blocks, the present invention can determine the inter-view motion vector of the current texture block using the acquired inter-view motion vectors, thereby obtaining an accurate inter-view motion vector and improving accuracy of inter-view prediction.

BEST MODE

Figure 1:
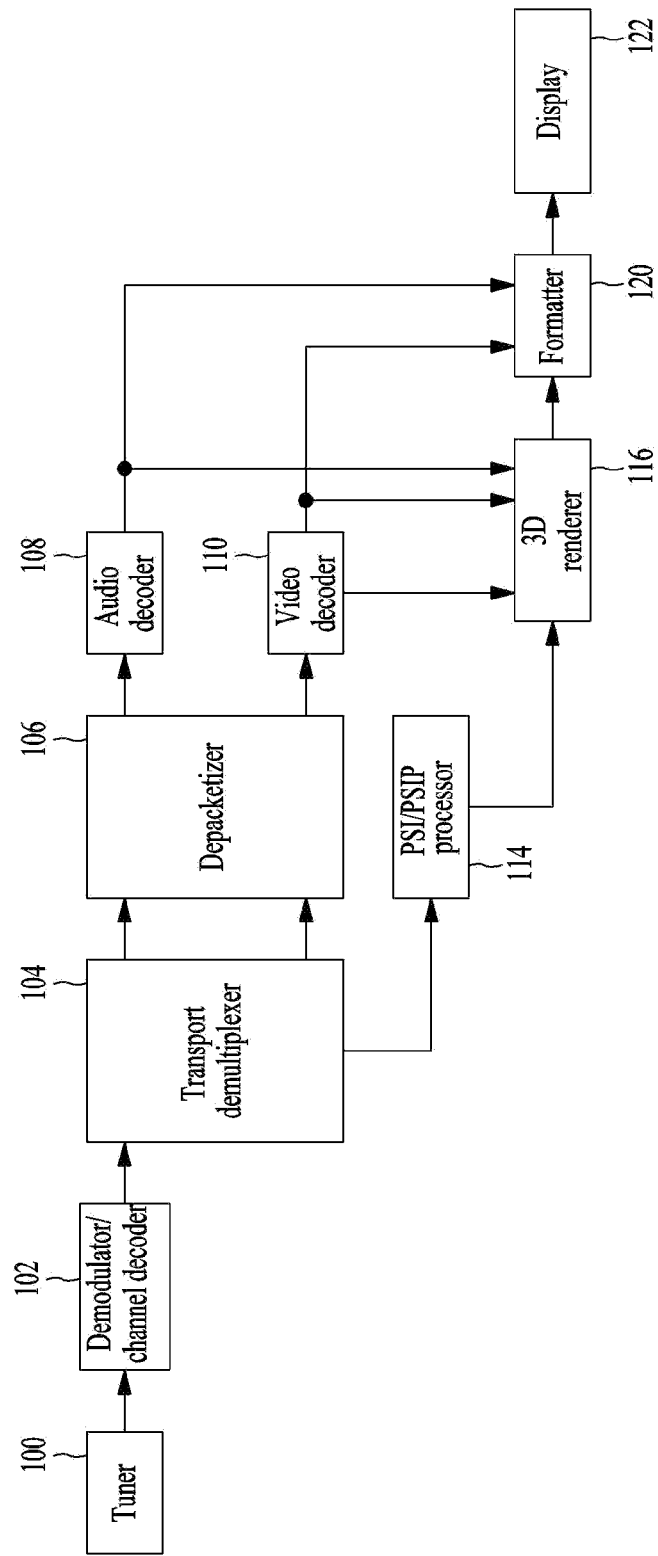
FIG. 1 is a block diagram of a broadcast receiver to which depth coding is applied according to an embodiment to which the present invention is applied.

The present invention provides a method and apparatus for processing a video signal, which check a neighboring block of a current texture block, acquire an inter-view motion vector of the current texture block from the neighboring block and decode the current texture block using the acquired inter-view motion vector, wherein the neighboring block includes a spatial neighboring block and a temporal neighboring block, wherein the spatial neighboring block includes at least one of a left lower block, a left block, a left upper block, an upper block and a right upper block, and the temporal neighboring block includes at least one of a collocated block of the current texture block and a collocated right lower block of the collocated block.

The checking of the neighboring block includes checking the spatial neighboring block and then checking the temporal neighboring block.

The checking of the neighboring block includes comparing acquired inter-view motion vectors and determining the inter-view motion vector of the current texture block on the basis of comparison.

The checking of the spatial neighboring block includes sequentially checking the left block, the upper block, the right upper block, the left lower block and the left upper block of the current texture block, and checking of the temporal neighboring block includes sequentially checking the collocated block of the current texture block and the collocated right lower block.

The checking of the neighboring block includes checking the spatial neighboring block and then checking the temporal neighboring block.

The checking of the neighboring block includes checking the temporal neighboring block and then checking the spatial neighboring block.

The comparing of the inter-view motion vectors includes comparing horizontal components of the inter-view motion vectors, and the determining of the inter-view motion vector of the current texture block includes determining an inter-view motion vector having a largest absolute value of a horizontal component thereof as the inter-view motion vector of the current texture block.

MODES FOR INVENTION

Techniques for compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include encoding and decoding in the specification and can be flexibly interpreted within the technical spirit and technical scope of the present invention.

FIG. 1 is a block diagram of a broadcast receiver to which depth coding is applied according to an embodiment to which the present invention is applied.

The broadcast receiver according to the present embodiment receives terrestrial broadcast signals to reproduce images. The broadcast receiver can generate three-dimensional content using received depth related information. The broadcast receiver includes a tuner 100, a demodulator/channel decoder 102, a transport demultiplexer 104, a depacketizer 106, an audio decoder 108, a video decoder 110, a PSI/PSIP processor 114, a 3D renderer 116, a formatter 120 and a display 122.

The tuner 100 selects a broadcast signal of a channel tuned by a user from among a plurality of broadcast signals input through an antenna (not shown) and outputs the selected broadcast signal. The demodulator/channel decoder 102 demodulates the broadcast signal from the tuner 100 and performs error correction decoding on the demodulated signal to output a transport stream TS. The transport demultiplexer 104 demultiplexes the transport stream so as to divide the transport stream into a video PES and an audio PES and extract PSI/PSIP information. The depacketizer 106 depacketizes the video PES and the audio PES to restore a video ES and an audio ES. The audio decoder 108 outputs an audio bitstream by decoding the audio ES. The audio bitstream is converted into an analog audio signal by a digital-to-analog converter (not shown), amplified by an amplifier (not shown) and then output through a speaker (not shown). The video decoder 110 decodes the video ES to restore the original image. The decoding processes of the audio decoder 108 and the video decoder 110 can be performed on the basis of a packet ID (PID) confirmed by the PSI/PSIP processor 114. During the decoding process, the video decoder 110 can extract depth information. In addition, the video decoder 110 can extract additional information necessary to generate an image of a virtual camera view, for example, camera information or information for estimating an occlusion hidden by a front object (e.g. geometrical information such as object contour, object transparency information and color information), and provide the additional information to the 3D renderer 116. However, the depth information and/or the additional information may be separated from each other by the transport demultiplexer 104 in other embodiments of the present invention.

The PSI/PSIP processor 114 receives the PSI/PSIP information from the transport demultiplexer 104, parses the PSI/PSIP information and stores the parsed PSI/PSIP information in a memory (not shown) or a register so as to enable broadcasting on the basis of the stored information. The 3D renderer 116 can generate color information, depth information and the like at a virtual camera position using the restored image, depth information, additional information and camera parameters.

In addition, the 3D renderer 116 generates a virtual image at the virtual camera position by performing 3D warping using the restored image and depth information regarding the restored image. While the 3D renderer 116 is configured as a block separated from the video decoder 110 in the present embodiment, this is merely an exemplary and the 3D renderer 116 may be included in the video decoder 110.

The formatter 120 formats the image restored in the decoding process, that is, the actual image captured by a camera, and the virtual image generated by the 3D renderer 116 according to the display mode of the broadcast receiver such that a 3D image is displayed through the display 122. Here, synthesis of the depth information and virtual image at the virtual camera position by the 3D renderer 116 and image formatting by the formatter 120 may be selectively performed in response to a user command. That is, the user may manipulate a remote controller (not shown) such that a composite image is not displayed and designate an image synthesis time.

As described above, the depth information for generating the 3D image is used by the 3D renderer 116. However, the depth information may be used by the video decoder 110 in other embodiments. A description will be given of various embodiments in which the video decoder 110 uses the depth information.

Figure 2:
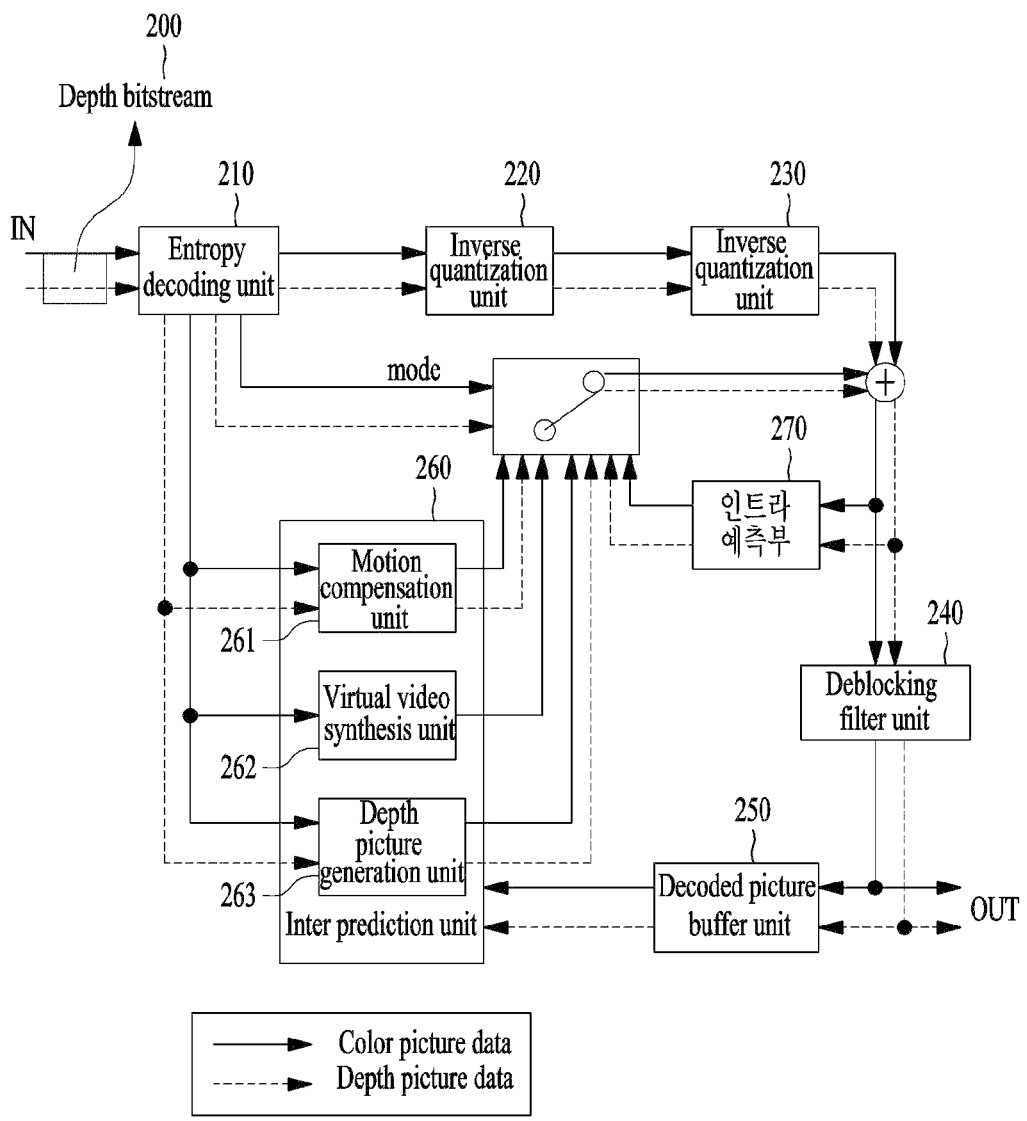
FIG. 2 is a block diagram of a video decoder according to an embodiment to which the present invention is applied.

FIG. 2 is a block diagram of the video decoder according to an embodiment to which the present invention is applied.

Referring to FIG. 2, the video decoder 110 may include an entropy decoding unit 210, an inverse quantization unit 220, an inverse transform unit 230, a deblocking filter unit 240, a decoded picture buffer unit 250, an inter prediction unit 260 and an intra prediction unit 270. In FIG. 2, solid lines represent flow of color picture data and dotted lines represent flow of depth picture data. While the color picture data and the depth picture data are separately represented in FIG. 2, separate representation of the color picture data and the depth picture data may refer to separate bitstreams or separate flows of data in one bitstream. That is, the color picture data and the depth picture data can be transmitted as one bitstream or separate bitstreams. FIG. 2 only shows data flows and does not limit operations to operation performed in one decoder.

First of all, to decode a received depth bitstream 200, the depth bitstream 200 is parsed per NAL. Here, various types of attribute information regarding depth may be included in an NAL header region, an extended region of the NAL header, a sequence header region (e.g. sequence parameter set), an extended region of the sequence header, a picture header region (e.g. picture parameter set), an extended region of the picture header, a slice header region, an extended region of the slice header, a slice data region or a macro block region. While depth coding may be performed using a separate codec, it may be more efficient to add attribute information regarding depth only in the case of depth bitstream if compatibility with existing codecs is achieved. For example, depth identification information for identifying a depth bitstream can be added to the sequence header region (e.g. sequence parameter set) or the extended region of the sequence header. Attribute information regarding a depth sequence can be added only when an input bitstream is a depth coded bitstream, according to the depth identification information.

The parsed depth bitstream 200 is entropy-decoded through the entropy decoding unit 210 and a coefficient, a motion vector and the like of each macro block are extracted. The inverse quantization unit 220 multiplies a received quantized value by a predetermined constant so as to obtain a transformed coefficient and the inverse transform unit 230 inversely transforms the coefficient to restore depth information of a depth picture. The intra prediction unit 270 performs intra prediction using the restored depth information of the current depth picture. The deblocking filter unit 240 applies deblocking filtering to each coded macro block in order to reduce block distortion. The deblocking filter unit improves the texture of a decoded frame by smoothing edges of blocks. A filtering process is selected depending on boundary strength and an image sample gradient around a boundary. Filtered depth pictures are output or stored in the decoded picture buffer unit 250 to be used as reference pictures.

The decoded picture buffer unit 250 stores or opens previously coded depth pictures for inter prediction. Here, to store coded depth pictures in the decoded picture buffer unit 250 or to open stored coded depth pictures, frame_num and POC (Picture Order Count) of each picture are used. Since the previously coded pictures may include depth pictures corresponding to views different from the current depth picture, depth view information for identifying views of depth pictures as well as frame_num and POC can be used in order to use the previously coded pictures as reference pictures in depth coding.

In addition, the decoded picture buffer unit 250 may use the depth view information in order to generate a reference picture list for inter-view prediction of depth pictures. For example, the decoded picture buffer unit 250 can use depth-view reference information. The depth-view reference information refers to information used to indicate dependence between views of depth pictures. For example, the depth-view reference information may include the number of depth views, a depth view identification number, the number of depth-view reference pictures, depth view identification numbers of depth-view reference pictures and the like.

The decoded picture buffer unit 250 manages reference pictures in order to implement more flexible inter prediction. For example, a memory management control operation method and a sliding window method can be used. Reference picture management unifies a reference picture memory and a non-reference picture memory into one memory, managing the unified memory and achieving efficient management with a small-capacity memory. In depth coding, depth pictures can be separately marked to be discriminated from color pictures in the decoded picture buffer unit and information for identifying each depth picture can be used in the marking process. Reference pictures managed through the aforementioned procedure can be used for depth coding in the inter prediction unit 260.

Referring to FIG. 2, the inter prediction unit 260 may include a motion compensation unit 261, a virtual view synthesis unit 262 and a depth picture generation unit 263.

The motion compensation unit 261 compensates for motion of the current block using information transmitted from the entropy decoding unit 210. The motion compensation unit 261 extracts motion vectors of neighboring blocks of the current block from a video signal and acquires a motion vector prediction value of the current block. The motion compensation unit 261 compensates for motion of the current block using the motion vector prediction value and a differential vector extracted from the video signal. Motion compensation may be performed using one reference picture or a plurality of pictures. In depth coding, motion compensation can be performed using information on a reference picture list for inter-view prediction of depth pictures stored in the decoded picture buffer unit 250 when the current depth picture refers to a depth picture of a different view. Further, motion compensation may be performed using depth view information for identifying the view of the depth picture.

The virtual view synthesis unit 262 synthesizes a color picture of a virtual view using color pictures of neighboring views of the view of the current color picture. To use color pictures of neighboring views or to use color pictures of a desired specific view, view identification information indicating the views of the color pictures can be used. When the color picture of the virtual view is generated, flag information indicating whether the color picture of the virtual view is generated can be defined. When the flag information indicates generation of the color picture of the virtual view, the color picture of the virtual view can be generated using the view identification information. The color picture of the virtual view, acquired through the virtual view synthesis unit 262, may be used as a reference picture. In this case, the view identification information can be assigned to the color picture of the virtual view.

In another embodiment, the virtual view synthesis unit 262 can synthesize a depth picture of a virtual view using depth pictures corresponding to neighboring views of the view of the current depth picture. In this case, depth view identification information indicating the view of a depth picture can be used. Here, the depth view identification information can be derived from view identification information of a corresponding color picture. For example, the corresponding color picture can have the same picture output order information and the same view identification information as those of the current depth picture.

The depth picture generation unit 263 can generate the current depth picture using depth coding information. Here, the depth coding information may include a distance parameter indicating a distance between a camera and an object (e.g. a Z-coordinate value on a camera coordinate system or the like), macro block type information for depth coding, information for identifying a boundary in a depth picture, information indicating whether data in RBSP includes depth-coded data, information indicating whether a data type is depth picture data, color picture data or parallax data and the like. In addition, the current depth picture may be predicted using the depth coding information. That is, inter prediction using neighboring depth pictures of the current depth picture can be performed and intra prediction using decoded depth information in the current depth picture can be performed.

A description will be given of a method for decoding a current texture block using the video decoder.

An inter-view motion vector may be acquired from a neighboring block of the current texture block. Neighboring blocks of the current texture block may include a spatial neighboring block and a temporal neighboring block. The current texture block may be coded using the inter-view motion vector. A reference block of the current texture block may be specified using the acquired inter-view motion vector. The current texture block can be coded using the reference block. Neighboring blocks will be described later with reference to FIGS. 3 and 4 and a method for acquiring an inter-view motion vector will be described later with reference to FIG. 5.

Figure 3:
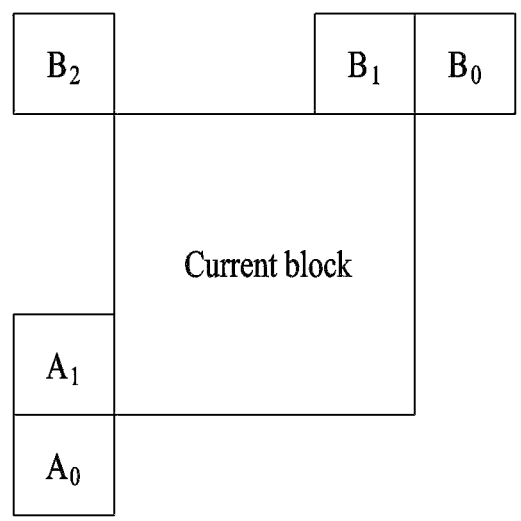
FIG. 3 illustrates exemplary spatial neighboring blocks according to an embodiment to which the present invention is applied.

FIG. 3 illustrates exemplary spatial neighboring blocks according to an embodiment to which the present invention is applied.

Referring to FIG. 3, spatial neighboring blocks may include at least one of a left lower block A0, a left block A1, a right upper block B0, an upper block B1 and a left upper block B2.

When the left block B1 is smaller than the current texture block, the current texture block may further have at least one left neighboring block. For example, the spatial neighboring blocks according to the present invention may further include a left block located between the left block A1 and the left upper block B2. In the same manner, the spatial neighboring blocks according to the present invention may further include an upper block located between the upper block B1 and the left upper block B2 when the upper block B1 is smaller than the current texture block.

Figure 4:
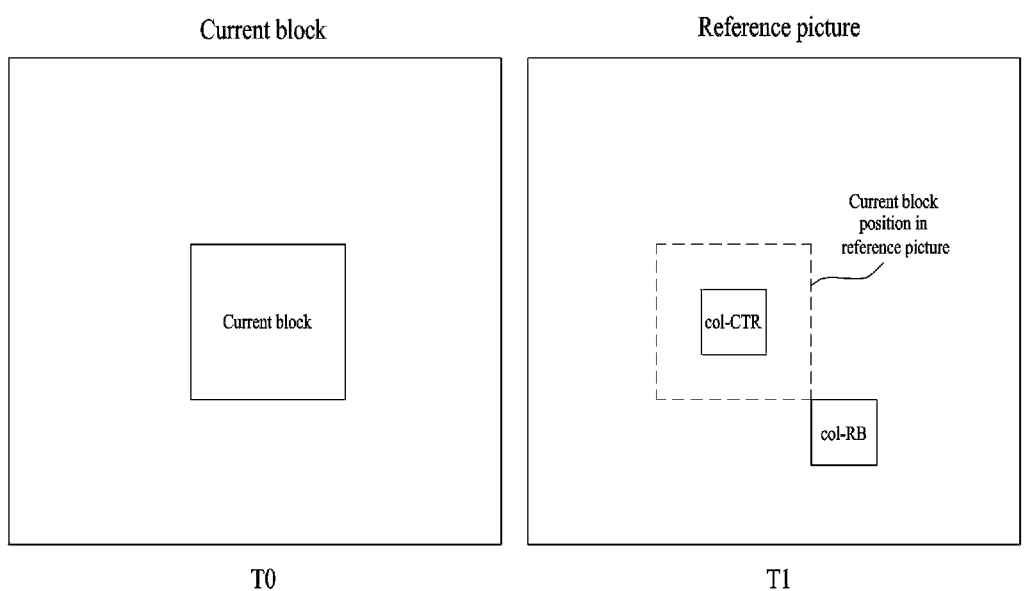
FIG. 4 illustrates exemplary temporal neighboring blocks according to an embodiment to which the present invention is applied.

FIG. 4 illustrates exemplary temporal neighboring blocks according to an embodiment to which the present invention is applied.

Referring to FIG. 4, a temporal neighboring block may refer to a block (referred to as collocated block hereinafter) in the same position as the current texture block within a reference picture of the current texture block. Here, the reference picture may refer to a picture located at the same view as the current picture including the current texture block while corresponding to a time different from that of the current picture.

The collocated block col-CTR may be defined as a block including a position in the reference picture, which corresponds to the position of the center pixel of the current texture block. Otherwise, the collocated block col-CTR may be defined as a block including a position in the reference picture, which corresponds to the position of a left upper pixel of the current texture block.

A collocated right lower block col-RB may be defined as a block in the reference picture, which corresponds to a right lower pixel of the current block position in a collocated picture including the collocated block col-CTR. The current block position in the reference picture, indicated by a dotted line, may be a left upper pixel position corresponding to the position of the current block in the reference picture.

A description will be given of a method for acquiring an inter-view motion vector with reference to FIG. 5.

Figure 5:
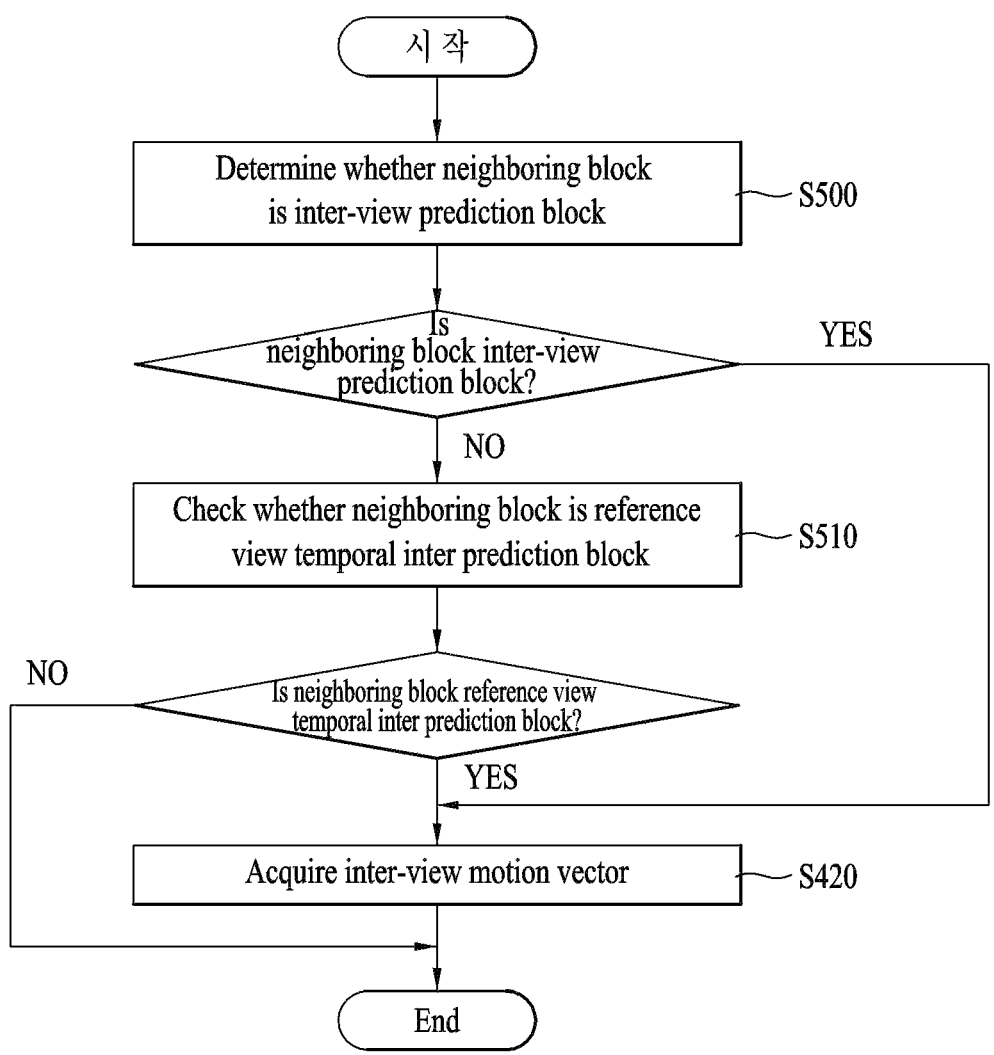
FIG. 5 is a flowchart illustrating an exemplary method for acquiring an inter-view motion vector of a current texture block according to an embodiment to which the present invention is applied.

FIG. 5 is a flowchart illustrating an exemplary method for acquiring an inter-view motion vector of the current texture block according to an embodiment to which the present invention is applied.

It is checked whether neighboring blocks of the current texture block are inter-view prediction blocks (S500). That is, the neighboring blocks of the current texture block are checked to determine whether the neighboring blocks have been coded using inter-view prediction. An inter-view prediction block is a block coded using inter-view prediction. Inter-view prediction will be described later.

The neighboring blocks may be checked in the order of spatial neighboring blocks and temporal neighboring blocks.

The spatial neighboring blocks may include the left block A1, upper block B1, right upper block B0, left lower block A0 and left upper block B2 of the current texture block, as described with reference to FIG. 3. The spatial neighboring blocks may be checked in the order of the left block A1, upper block B1, right upper block B0, left lower block A0 and the left upper block B2. For example, only the left block A1 and upper block B1, from among the spatial neighboring blocks, can be checked in order.

Temporal neighboring blocks of the current texture block may include a collocated block and a collocated right lower block, as described with reference to FIG. 4. The temporal neighboring blocks may be checked in the order of the collocated block and the collocated right lower block. Otherwise, the collocated right lower block may be checked and then the collocated block may be checked. Alternatively, only part of the temporal neighboring blocks may be checked. For example, only the collocated block can be checked.

Alternatively, neighboring blocks may be checked in the order of temporal neighboring blocks and spatial neighboring blocks. Further, only part of the temporal neighboring blocks may be checked and only part of the spatial neighboring blocks may be checked. For example, the collocated right lower block col-RB, left block A1 and upper block B1 can be sequentially checked. The temporal neighboring block checking order and the spatial neighboring block checking order may be as described above.

Neighboring block checking orders are not limited to the aforementioned orders and combinations thereof and may be combined such that checked neighboring blocks include at least one temporal neighboring block and at least one spatial neighboring block.

When the neighboring blocks of the current texture block do not include an inter-view prediction block, it is checked whether the neighboring blocks are reference view temporal inter prediction blocks (S510). That is, it is checked whether the neighboring blocks have been coded using reference view temporal inter prediction. A reference view temporal prediction block is a block coded using reference view temporal prediction. Reference view temporal prediction will be described later. Neighboring block checking orders may be the same as the aforementioned neighboring block checking orders. It is possible to check whether only part of the neighboring blocks is a reference view temporal inter prediction block. For example, the left block A1 and upper block B1 are sequentially checked and the temporal neighboring blocks may not be checked.

When a neighboring block of the current texture block is an inter-view prediction block or a reference view temporal inter prediction block, an inter-view motion vector used to code the neighboring block can be acquired (S520). Blocks other than the neighboring block corresponding to the acquired inter-view motion vector may not be checked.

In the method for acquiring an inter-view motion vector of the current texture block, illustrated in FIG. 5, when an inter-view motion vector has been acquired from an inter-view prediction block or a reference view temporal inter prediction block by checking neighboring blocks, other neighboring blocks are not checked. Accordingly, coding complexity can be reduced.

Figure 6:
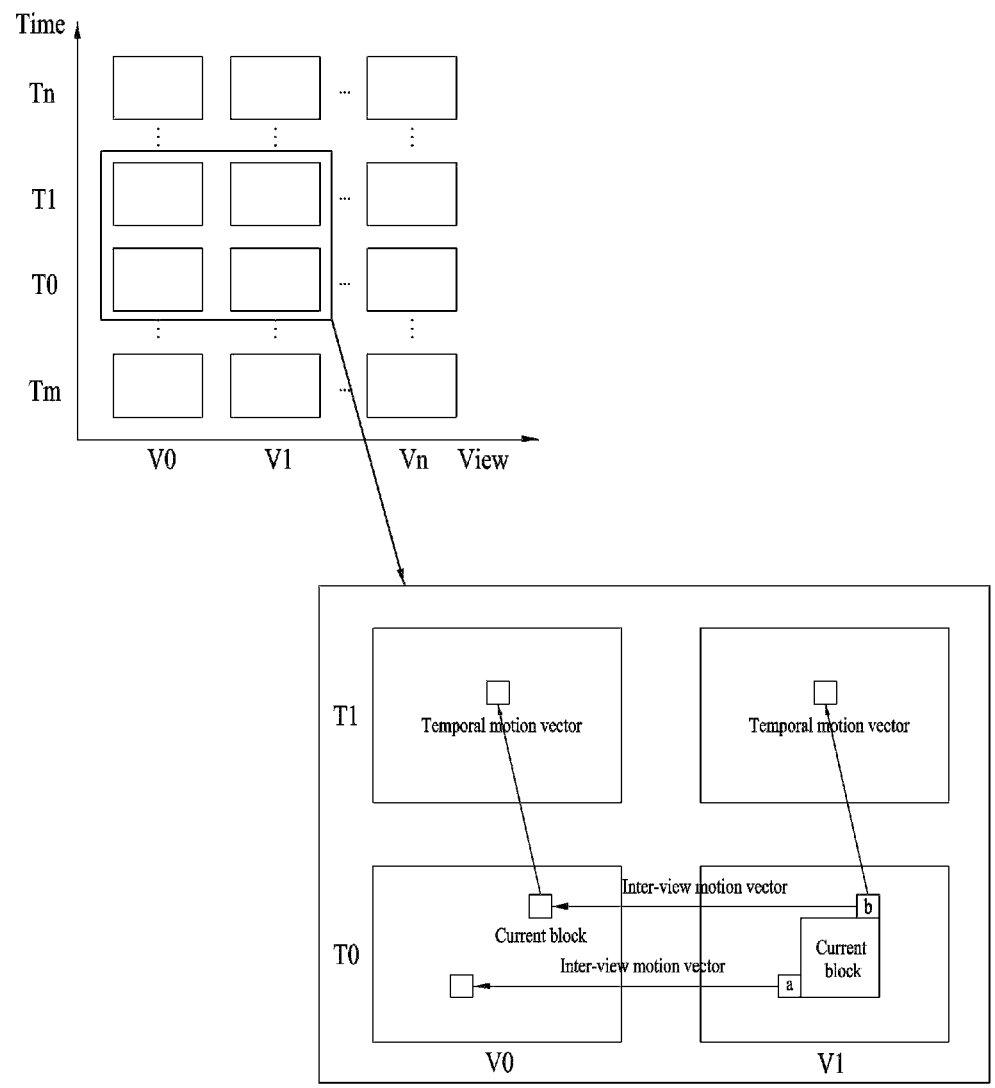
FIG. 6 illustrates an example of acquiring an inter-view motion vector from spatial neighboring blocks according to an embodiment to which the present invention is applied.

FIG. 6 illustrates an example of acquiring an inter-view motion vector from a spatial neighboring block according to an embodiment to which the present invention is applied.

A spatial neighboring block a of the current block is an inter-view prediction block coded using inter-view prediction. Inter-view prediction will be described as an example of inter prediction prior to description of a process of acquiring an inter-view motion vector from a spatial neighboring block.

In the case of a multi-view image obtained by a plurality of cameras, inter-view prediction, which is inter prediction of different views, may be additionally performed.

Inter-view prediction can refer to inter prediction using a reference picture located at a view different from the current block and motion information of the current texture block. For example, the block a, shown in FIG. 6, can be coded through inter-view prediction using the current block indicated by the inter-view motion vector of the block a and a reference block in a reference picture located at a different view.

In the specification, view motion information used for inter-view prediction can be flexibly interpreted as information including an inter-view motion vector and inter-view reference index information for convenience of understanding.

A description will be given of a method for determining whether a neighboring block has been coded through inter-view prediction.

In one embodiment, whether a neighboring block has been coded through inter-view prediction can be determined on the basis of whether the neighboring block uses an inter-view reference picture list. The inter-view reference picture list can refer to a list including the neighboring block and a reference picture located at a view different from the view of the neighboring block. Alternatively, whether the neighboring block has been coded through inter-view prediction may be determined on the basis of reference index information of the neighboring block. For example, when the reference index information of the neighboring block specifies a reference picture located at a view different from the view of the neighboring block, it can be determined that the neighboring block has been coded through inter-view prediction. Alternatively, whether the neighboring block has been coded through inter-view prediction may be determined on the basis of POCs of the reference picture of the neighboring block and the current picture and view information of the reference picture of the neighboring block and the current picture. POC is output order information and pictures in the same access unit can have the same POC. View information can represent a view of each picture. When the reference picture and the current picture have the same POC and the view information of the reference picture differs from that of the current picture, it can be determined that the corresponding neighboring block has been coded through inter-view prediction.

A description will be given of temporal inter prediction as another example of inter prediction.

Temporal inter prediction may refer to inter prediction using a reference picture, which is located at the same view as the current texture block while corresponding to a time different from that of the current texture block and motion information of the current texture block. In the specification, temporal motion information used for temporal inter prediction can be flexibly interpreted as information including a temporal motion vector and temporal reference index information for convenience of understanding.

A block coded using temporal inter prediction may be referred to as a temporal inter prediction block. A description will be given of a reference view temporal inter prediction block as an exemplary temporal inter prediction block.

A block coded using a temporal motion vector of the corresponding block, such as spatial neighboring block b of the current block, shown in FIG. 6, can be defined as a reference view temporal inter prediction block.

While reference view temporal inter prediction is an example of temporal inter prediction, reference view temporal inter prediction can perform temporal inter prediction using an inter-view motion vector. For example, referring to FIG. 6, the corresponding block is a block indicated by the inter-view motion vector of the neighboring block b of the current block and can be located at a view different from the view of the current block while corresponding to the same time as the current block. When the corresponding block has been coded using temporal inter prediction, a temporal motion vector used for coding of the corresponding block can be used to code the block b.

In the specification, the reference view temporal inter prediction block and the temporal inter prediction block can be discriminated from each other using reference view temporal inter prediction information inter_view_motion_pred_flag. Further, whether the current texture block is a reference view temporal inter prediction block can be recognized using the reference view temporal inter prediction information inter_view_motion_pred_flag, and an inter-view motion vector can be acquired from the reference view temporal inter prediction block.

A description will be given of a procedure of acquiring an inter-view motion vector when a spatial neighboring block is an inter-view prediction block or a reference view temporal inter prediction block.

For example, the block a, shown in FIG. 6, can be coded using inter-view prediction. An inter-view motion vector used for inter-view prediction can be acquired from the block a corresponding to an inter-view prediction block. The block b, shown in FIG. 6, can be coded using reference view temporal inter prediction. An inter-view motion vector used for reference view temporal inter prediction can be acquired from the block b corresponding to a reference view temporal inter prediction block.

Figure 7:
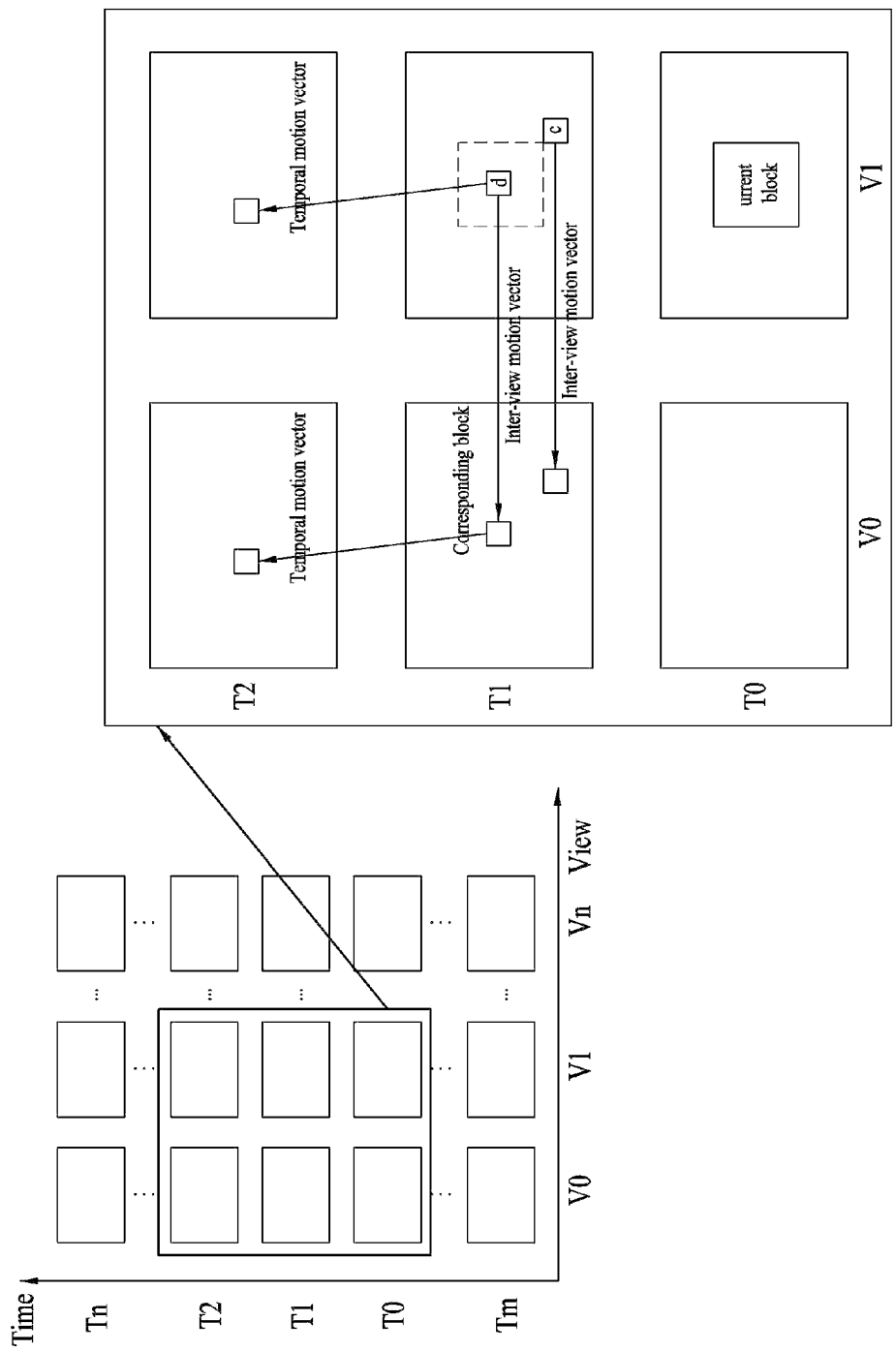
FIG. 7 illustrates an example of acquiring an inter-view motion vector from temporal neighboring blocks according to an embodiment to which the present invention is applied.

FIG. 7 illustrates an example of acquiring an inter-view motion vector from a temporal neighboring block according to an embodiment to which the present invention is applied.

For example, a block c in FIG. 7 can be coded using inter-view prediction. An inter-view motion vector used for inter-view prediction can be acquired from the block c corresponding to an inter-view prediction block. A block d, shown in FIG. 7, can be coded using reference view temporal inter prediction. An inter-view motion vector used for reference view temporal inter prediction can be acquired from the block d corresponding to a reference view temporal inter prediction block.

Figure 8:
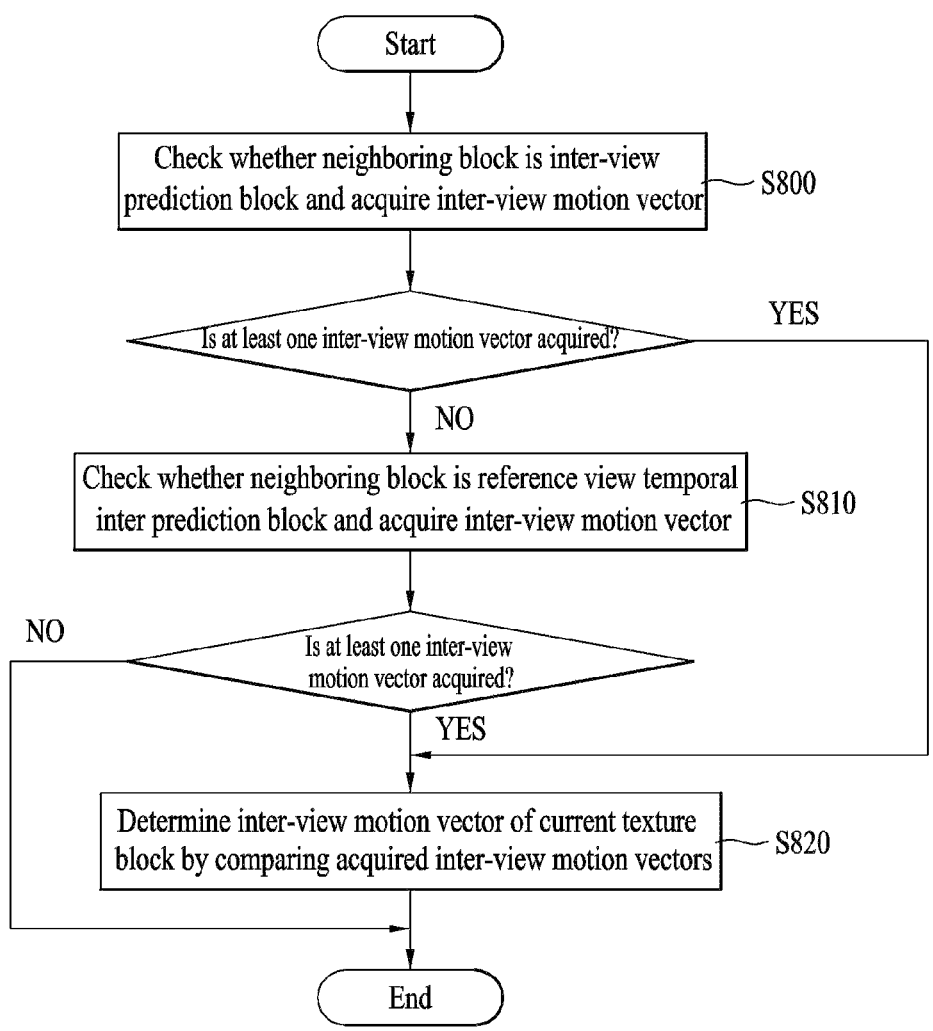
FIG. 8 is a flowchart illustrating another exemplary method for acquiring an inter-view motion vector of a current texture block according to an embodiment to which the present invention is applied.

FIG. 8 is a flowchart illustrating another exemplary method for acquiring the inter-view motion vector of the current texture block according to an embodiment to which the present invention is applied.

Whether neighboring blocks are inter-view prediction blocks may be checked and an inter-view motion vector may be acquired (S800). Neighboring blocks of the current texture block can be checked to determine whether the neighboring blocks have been coded using inter-view prediction. Neighboring block checking order is as described above with reference to FIG. 5. When a neighboring block is an inter-view prediction block, an inter-view motion vector used for inter-view prediction of the neighboring block can be acquired. When a plurality of inter-view prediction blocks is present, a plurality of inter-view motion vectors can be acquired.

When there is no neighboring block corresponding to an inter-view prediction block, whether the neighboring blocks are reference view temporal inter prediction blocks may be checked and an inter-view motion vector may be acquired (S810). Whether the neighboring blocks have been coded using reference view temporal prediction can be checked as in step S510 of FIG. 5. Neighboring block checking order may be as described above with reference to FIG. 5. When a neighboring block corresponds to a reference view temporal inter prediction block, an inter-view motion vector used for reference view temporal inter prediction of the neighboring block can be acquired. When a plurality of reference view temporal inter prediction blocks is present, a plurality of inter-view motion vectors can be acquired.

When inter-view motion vectors are acquired from inter-view prediction blocks or reference view temporal inter prediction blocks, the inter-view motion vector of the current texture block can be determined by comparing the acquired inter-view motion vectors (S820). A description will be given of a method of comparing acquired inter-view motion vectors in order to determine the inter-view motion vector of the current texture block according to an embodiment of the present invention.

The inter-view motion vector of the current texture block can be determined by comparing horizontal components of acquired inter-view motion vectors. An inter-view motion vector having a largest absolute value of the horizontal component thereof, from among the inter-view motion vectors acquired in S800 or S810, can be determined as the inter-view motion vector of the current texture block.

TABLE 1

| | Neighboring block | | | | | | |
|---|---|---|---|---|---|---|---|
| | A1 | B1 | A0 | B0 | B2 | Col-CTR | Col-RB |
| Whether neighboring block is inter-view prediction block | Yes | No | Yes | Yes | No | Yes | No |
| Inter-view motion vector | (8, 3) | | (4, 3) | (13, 0) | | (7, 2) | |

For example, when neighboring blocks A1, A0, B0 and Col-CTR are inter-view prediction blocks and inter-view motion vectors are acquired from the neighboring blocks A1, A0, B0 and Col-CTR, the inter-view motion vector of the block B0, which has the largest absolute value of the horizontal component thereof, can be determined as the inter-view motion vector of the current texture block.

Alternatively, vertical components of acquired inter-view motion vectors are compared and an inter-view motion vector having a smallest vertical component can be determined as the inter-view motion vector of the current texture block. In the case of Table 1, for example, the inter-view motion vector of the block B0 having a smallest vertical component can be determined as the inter-view motion vector of the current texture block.

Alternatively, the inter-view motion vector of the current texture block can be determined using the mean value of acquired inter-view motion vectors. The inter-view motion vector of the current texture block may be determined using the mean value of the horizontal components of the inter-view motion vectors acquired in S800 or S810 and the mean value of the vertical components thereof. In the case of Table 1, for example, an inter-view motion vector (8,2) corresponding to the mean values of the horizontal components and vertical components of the acquired inter-view motion vectors can be determined as the inter-view motion vector of the current texture block.

The method for acquiring an inter-view motion vector, shown in FIG. 8, can improve accuracy of inter-view prediction by determining the inter-view motion vector of the current texture block using a plurality of inter-view motion vectors.

Figure 9:
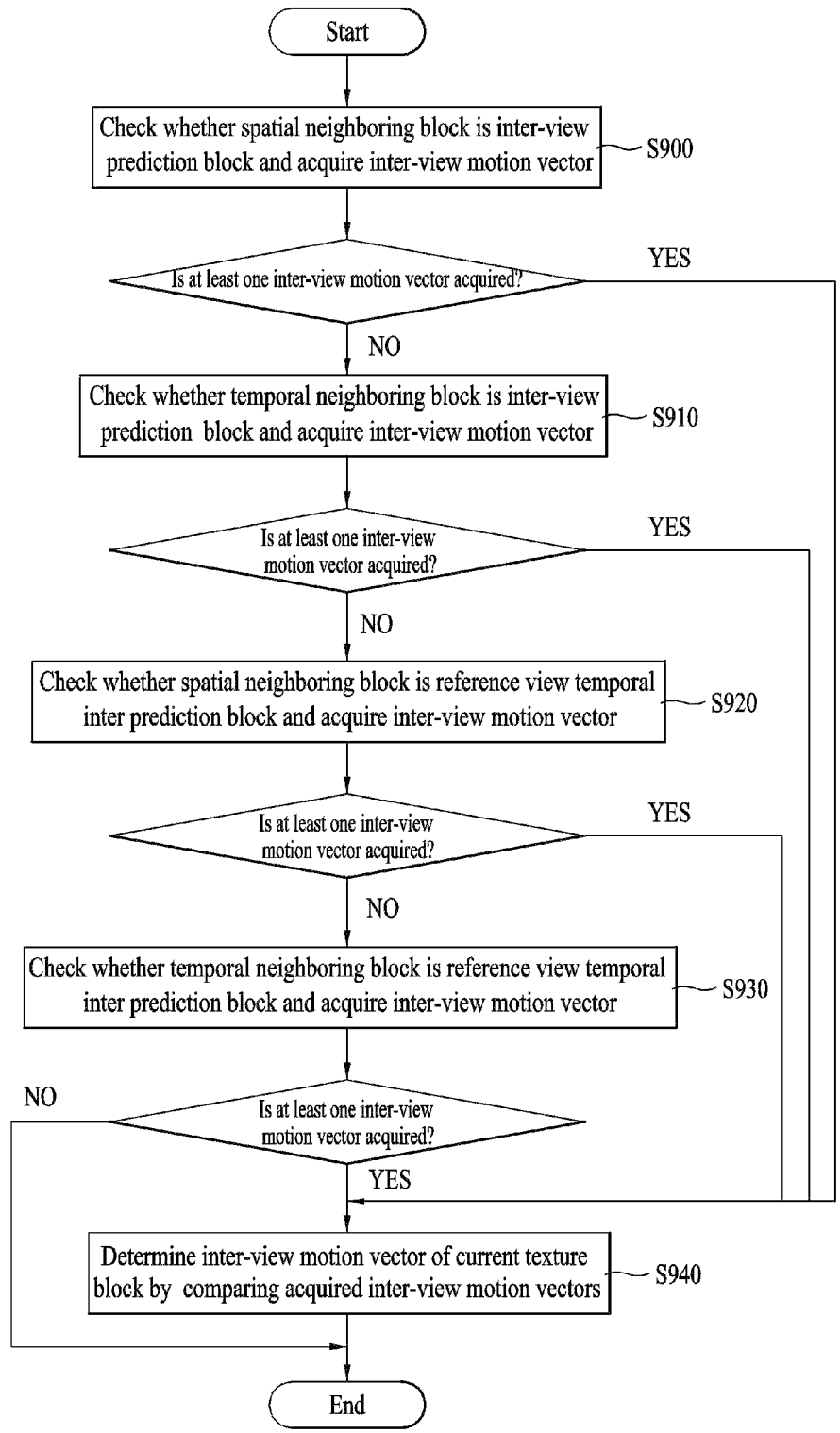
FIG. 9 is a flowchart illustrating another exemplary method for acquiring an inter-view motion vector of a current texture block according to an embodiment to which the present invention is applied.

FIG. 9 is a flowchart illustrating another exemplary method for acquiring the inter-view motion vector of the current texture block according to an embodiment to which the present invention is applied.

The method for acquiring the inter-view motion vector of the current texture block, shown in FIG. 9, corresponds to a combination of the methods described in FIGS. 5 and 8.

Whether spatial neighboring blocks include an inter-view prediction block is checked, and an inter-view motion vector may be acquired from a spatial neighboring block (S900). Spatial neighboring block checking order is as described above.

When the spatial neighboring blocks do not include any inter-view prediction block, whether temporal neighboring blocks include an inter-view prediction block is checked, and an inter-view motion vector may be acquired from a temporal neighboring block (S910). Temporal neighboring block checking order is as described above.

When the temporal neighboring blocks do not include any inter-view prediction block, whether the spatial neighboring blocks include a reference view temporal inter prediction block is checked and an inter-view motion vector may be acquired from a spatial neighboring block (S920). Spatial neighboring block checking order is as described above.

When the spatial neighboring blocks do not include any reference view temporal inter prediction block, whether the temporal neighboring blocks include a reference view temporal inter prediction block is checked and an inter-view motion vector may be acquired from a temporal neighboring block (S930). Temporal neighboring block checking order is as described above.

When inter-view motion vectors are acquired from neighboring blocks, the inter-view motion vector of the current texture block can be determined by comparing the acquired inter-view motion vectors (S940). When one inter-view motion vector is acquired, this inter-view motion vector can be determined as the inter-view motion vector of the current texture block. When a plurality of inter-view motion vectors is acquired, the inter-view motion vector of the current texture block can be determined using the aforementioned inter-view motion vector determination method.

Figure 10:
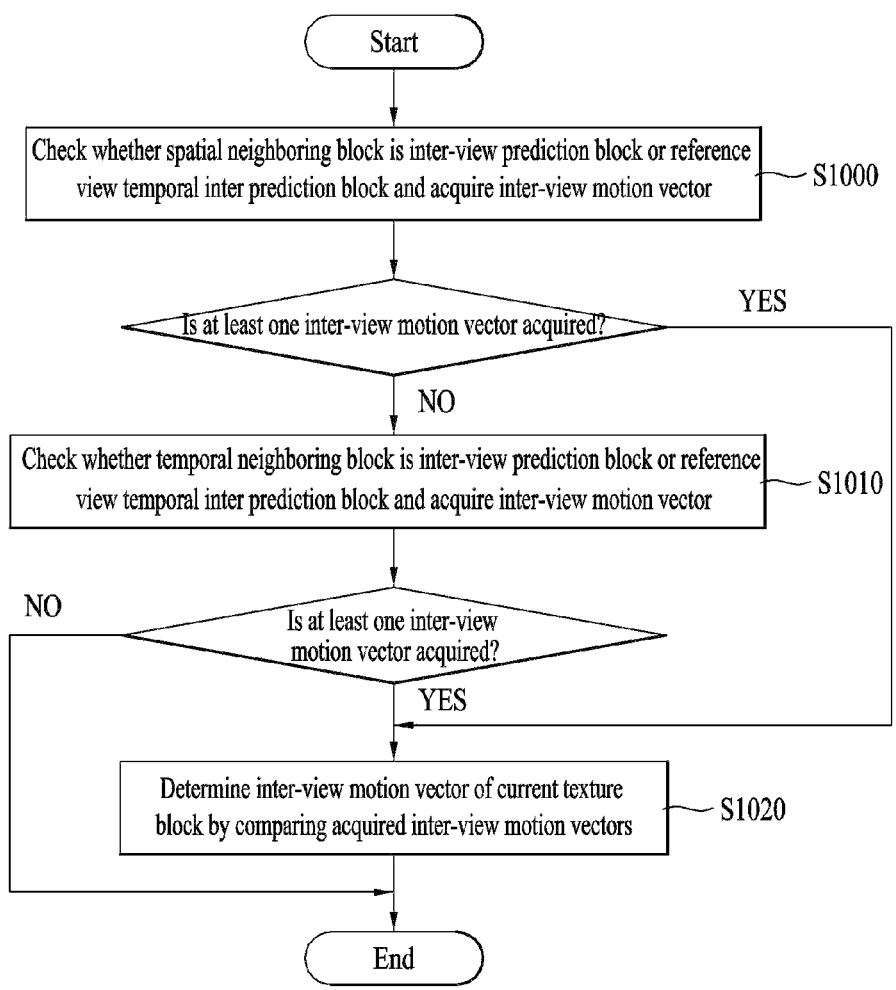
FIG. 10 is a flowchart illustrating another exemplary method for acquiring an inter-view motion vector of a current texture block according to an embodiment to which the present invention is applied.

FIG. 10 is a flowchart illustrating another exemplary method for acquiring the inter-view motion vector of the current texture block according to an embodiment to which the present invention is applied.

The method for acquiring the inter-view motion vector of the current texture block, shown in FIG. 10, can check whether neighboring blocks of the current texture block are inter-view prediction blocks and whether the neighboring blocks are reference view temporal inter prediction blocks in the same order of priority.

Specifically, whether spatial neighboring blocks are inter-view prediction blocks or reference view temporal inter prediction blocks may be checked (S1000). When spatial neighboring blocks corresponding to inter-view prediction blocks or reference view temporal inter prediction blocks are present, inter-view motion vectors may be acquired from the spatial neighboring blocks. It is possible to check whether the spatial neighboring blocks are inter-view prediction blocks or reference view temporal inter prediction blocks in the same order of priority. Spatial neighboring block checking order is as described above.

When an inter-view motion vector is not acquired from the spatial neighboring blocks, whether temporal neighboring blocks are inter-view prediction blocks or reference view temporal inter prediction blocks may be checked (S1010). When temporal neighboring blocks corresponding to inter-view prediction blocks or reference view temporal inter prediction blocks are present, inter-view motion vectors may be acquired from the temporal neighboring blocks. It is possible to check whether the temporal neighboring blocks are inter-view prediction blocks or reference view temporal inter prediction blocks in the same order of priority. Temporal neighboring block checking order is as described above.

When inter-view motion vectors are acquired from neighboring blocks, the inter-view motion vector of the current texture block can be determined by comparing the acquired inter-view motion vectors (S1020). When one inter-view motion vector is acquired, this inter-view motion vector can be determined as the inter-view motion vector of the current texture block. When a plurality of inter-view motion vectors is acquired, the inter-view motion vector of the current texture block can be determined using the aforementioned inter-view motion vector determination method.

Figure 11:
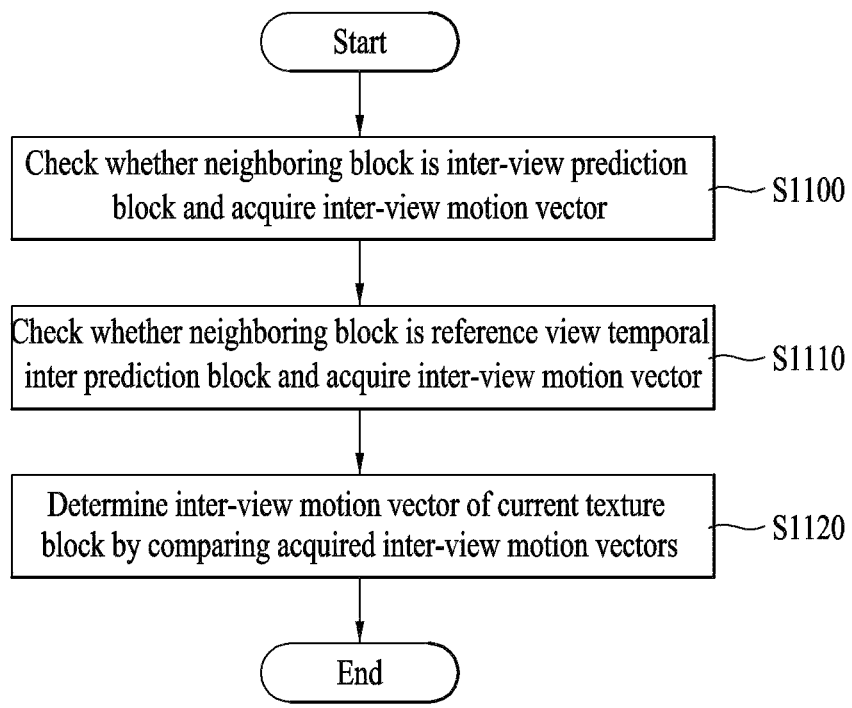
FIG. 11 is a flowchart illustrating another exemplary method for acquiring an inter-view motion vector of a current texture block according to an embodiment to which the present invention is applied.

FIG. 11 is a flowchart illustrating another exemplary method for acquiring the inter-view motion vector of the current texture block according to an embodiment to which the present invention is applied.

Whether neighboring blocks are inter-view prediction blocks is checked, and an inter-view motion vector may be acquired (S1100). Neighboring block checking order is as described above. For example, it is possible to check whether the collocated block col-CTR is an inter-view prediction block, check whether the left block A1 is an inter-view prediction block, and then check whether the upper block B1 is an inter-view prediction block.

Whether neighboring blocks are reference view temporal inter prediction blocks is checked, and an inter-view motion vector may be acquired (S1110). Neighboring block checking order is as described above. For example, it is possible to check whether the left block A1 is a reference view temporal inter prediction block and then check whether the upper block B1 is a reverence view temporal inter prediction block.

The inter-view motion vector of the current texture block can be determined by comparing acquired inter-view motion vectors (S1120). The inter-view motion vector of the current texture block can be acquired from inter-view motion vectors obtained from neighboring blocks in S1100 and S1110 using the method described above with reference to FIG. 8.

The methods for acquiring the inter-view motion vector of the current texture block according to the present invention are not limited to the aforementioned embodiments and can include combinations of the above-described embodiments and embodiments in which neighboring block checking order is changed.

As described above, the decoding/encoding apparatus to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission through the Internet). In addition, a bitstream generated according to the encoding method may be stored in a computer-readable recording medium or transmitted using a wired/wireless communication network.

INDUSTRIAL APPLICABILITY

The present invention can be used to code a video signal.

The invention claimed is:

1. A method for processing a video signal by a video decoder, comprising:
   checking whether a temporal neighboring block of a current texture block is an inter-view prediction block;
   when the temporal neighboring block is the inter-view prediction block, obtaining an inter-view motion vector of the temporal neighboring block;
   when the temporal neighboring block is not the inter-view prediction block, checking whether a spatial neighboring block of the current texture block is the inter-view prediction block;
   when the spatial neighboring block of the current texture block is the inter-view prediction block, obtaining an inter-view motion vector of the spatial neighboring block; and
   obtaining an inter-view motion vector of the current texture block as the obtained inter-view motion vector of the temporal neighboring block or the obtained inter-view motion vector of the spatial neighboring block,
   wherein when the temporal neighboring block is the inter-view prediction block, the spatial neighboring block of the current texture block is not checked, and
   wherein the temporal neighboring block includes a collocated block, and the spatial neighboring block includes a left block and an upper block.

2. The method according to claim 1, wherein the checking whether the temporal neighboring block of a current texture block is an inter-view prediction block comprises:
   obtaining view information corresponding to a reference picture of the temporal neighboring block; and
   comparing the view information corresponding to reference picture of the temporal neighboring block and view information of the temporal neighboring block.

3. The method according to claim 1, wherein the checking whether the spatial neighboring block of the current texture block is the inter-view prediction block comprises:

obtaining a reference picture list of the spatial neighboring block; and determining whether the reference picture list of the spatial neighboring block is an inter-view reference picture list.

4. A video decoder, comprising:

a memory;

a hardware processor; and an inter prediction unit, coupled to the memory and the hardware processor, that:

checks whether a temporal neighboring block of a current texture block is an inter-view prediction block, obtains an inter-view motion vector of the temporal neighboring block when the neighboring block is the inter-view prediction block, when the temporal neighboring block is not the inter-view prediction block, checks whether a spatial neighboring block of the current texture block is the inter-view prediction block, when the spatial neighboring block of the current texture block is the inter-view prediction block, obtains an inter-view motion vector of the spatial neighboring block, and obtains an inter-view motion vector of the current texture block using as the obtained inter-view motion vector of the temporal neighboring block or the obtained inter-view motion vector of the spatial neighboring block, wherein when the temporal neighboring block is the inter-view prediction block, the spatial neighboring block of the current texture block is not checked, and wherein the temporal neighboring block includes a collocated block of the current texture block, and the spatial neighboring block includes a left block and an upper block.

5. The video decoder according to claim 4, wherein the inter prediction unit obtains view information corresponding to a reference picture of the temporal neighboring block and compares the view information corresponding to reference picture of the temporal neighboring block and view information of the temporal neighboring block.

6. The video decoder according to claim 4, wherein the inter prediction unit obtains a reference picture list of the spatial neighboring block and determines whether the reference picture list of the spatial neighboring block is an inter-view reference picture list.

* * * * *